April 8, 1969   G. A. WILCHER   3,436,955
MEANS TO CREATE A PREDETERMINED TEST PRESSURE
Filed Aug. 28, 1967
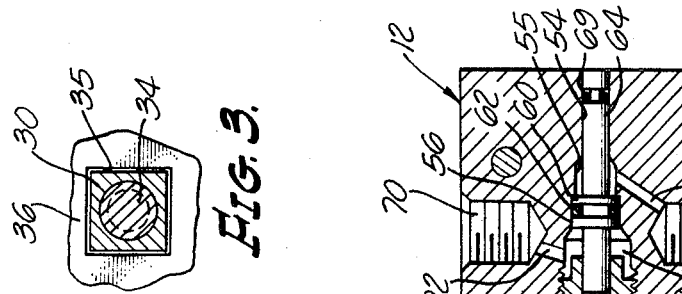
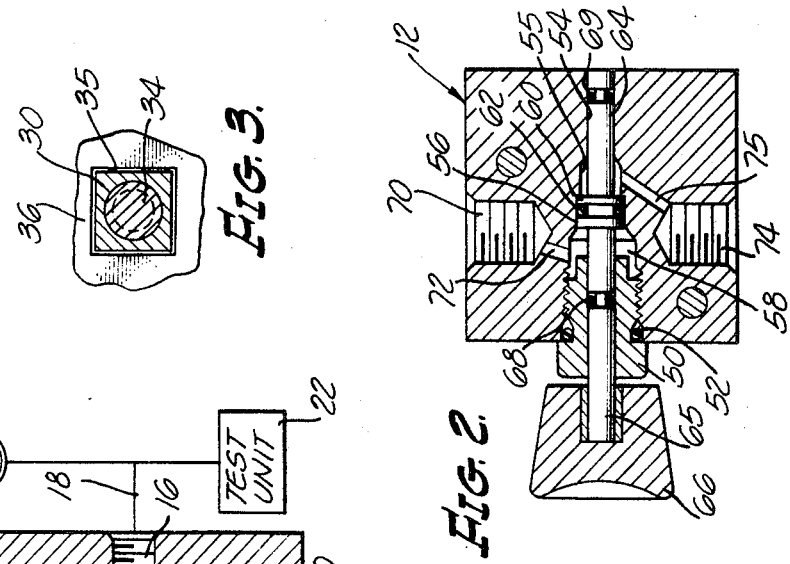
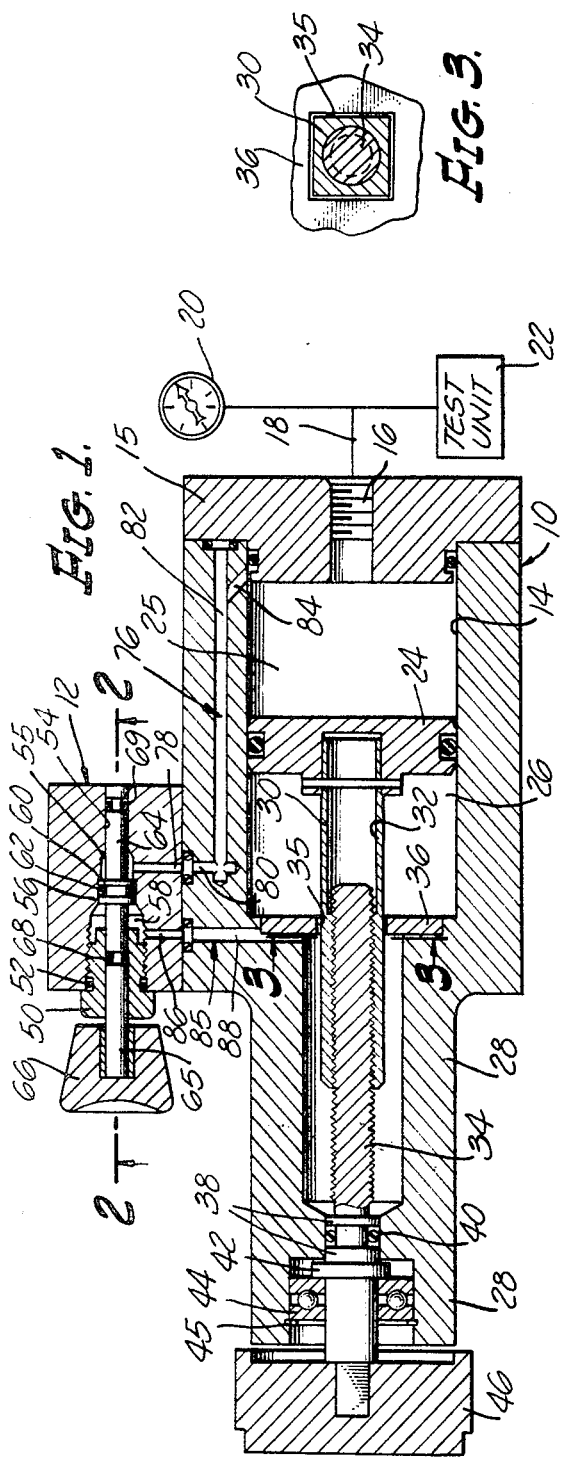
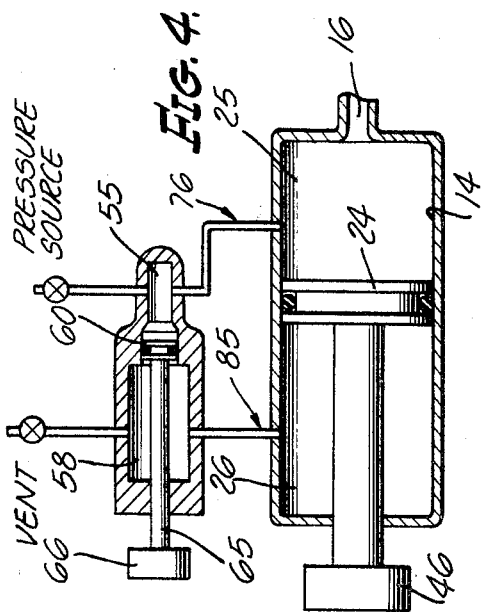
GAYLE A. WILCHER
INVENTOR
BY
Paul A. Weilein
ATTORNEY United States Patent Office 3,436,955
Patented Apr. 8, 1969

3,436,955
MEANS TO CREATE A PREDETERMINED TEST PRESSURE
Gayle A. Wilcher, Pasadena, Calif., assignor to G.R.S. Engineering Co. Inc., Inglewood, Calif., a corporation of California
Filed Aug. 28, 1967, Ser. No. 663,838
Int. Cl. G01l *27/00;* G01m *3/00;* F15b *7/00*
U.S. Cl. 73—4                     12 Claims

ABSTRACT OF THE DISCLOSURE

An apparatus for creating a precise gas pressure for test purposes has a cylinder divided by a manually operable piston into a control chamber for communication with a test device and an equalizing chamber, the two chambers being interconnected by an isolation valve which is also connected to a pressure source. At its open position the isolation valve places both chambers in communication with the pressure source for the initial establishment of equal pressures in the two chambers and at its closed position it isolates the control chamber to permit pressure in the control chamber to be varied by manual movement of the piston. The isolation valve is pressure-responsive to open to place the two chambers in communication with each other whenever the pressure in the control chamber exceeds the pressure in the equalizing chamber by a predetermined margin. Thus, the isolation valve opens automatically in the event that an excessive pressure in the control chamber relative to the pressure in the equalizing chamber is created either by admitting pressurized fluid to the control chamber while the isolation valve is inadvertently closed or by inadvertently venting the equalizing chamber while the isolation valve is closed and the control chamber under pressure.

BACKGROUND OF THE INVENTION

For the creation of a precise given air pressure in a device that is under test, it is common practice to employ a cylinder that is divided by a manually operable piston into what may be termed a control chamber and an equalizing chamber. In preparation for a test the control chamber is placed in communication with the device that is to be tested and both chambers and the test device are placed under the same pressure by placing both chambers in communication with a source of air compressed to a pressure near the desired precise pressure. The control chamber is then isolated from the equalizing chamber by means of an isolation valve and then the piston is manually advanced or retracted to change the pressure in the control chamber and in the test device to the desired precise pressure. A precision pressure apparatus of this general type is disclosed in the Siegel Patent No. 3,164,979.

An important purpose of the equalizing chamber is to prevent the creation of too large a pressure differential across the piston when the test pressure is relatively high and thus prevent excessive stressing of the piston with possible serious consequences. Unfortunately, however, this purpose of the equalizing chamber may be completely defeated by careless manipulation of the valves of the device. In too many instances, for example, an operator neglects to open the isolation valve prior to placing the apparatus in communication with the high pressure source. As a consequence, the high pressure fluid is admitted solely to one of the two chambers and all of the high pressure is directed solely against one face of the piston. Also, too often an operator inadvertently vents the equalizing chamber while both of the chambers are under high pressure and while the isolation valve is closed. The venting causes all of the high pressure to be directed solely against the face of the piston that is exposed to the control chamber.

SUMMARY OF THE INVENTION

The invention teaches that two features may work together to eliminate the above-mentioned hazards. The first feature is the location of the vent port in the equalizing chamber and the connection of the control chamber directly with the high pressure source, thereby to insure that in the event any pressure differential is created inadvertently the predominant pressure will be in the control chamber and not in the equalizing chamber. Thus, if fluid from the high pressure source is admitted to the test apparatus while the isolation valve is closed, the high pressure fluid will be admitted to the control chamber, not the equalizing chamber, and if the apparatus is vented while the isolation valve is closed and when both chambers are under pressure, the pressure will drop in the equalizing chamber and not in the control chamber.

With this assurance that any inadvertently created excessive pressure differential is in favor of the control chamber and not the equalizing chamber, the second feature is provision for a path of communication between the two chambers that will open automatically in the event that the pressure differential between the two chambers approaches an excessive magnitude. Within the scope of the invention a special by-pass may be provided between the two chambers for this purpose but a further feature of the preferred practice of the invention is the concept of avoiding additional structure by simply utilizing the isolation valve itself for such a by-pass.

To carry out this last concept, the isolation valve is divided into a first compartment and a second compartment, the two compartments being interconnected by a passage which forms a valve seat to cooperate with the isolation valve member. The first compartment of the isolation valve is connected both to the pressure source and to the control chamber and is, therefore, a part of a passage that connects the control chamber to the pressure source. The second compartment of the isolation valve has a vent port and is also connected to the equalizing chamber and, therefore, the second compartment is part of a vent passage for the equalizing chamber. In effect, the first compartment of the isolation valve is actually an extension of the control chamber and the second compartment of the isolation valve is actually an extension of the equalizing chamber.

The isolation valve member may be manually seated to cut off communication between the two compartments and thereby cut off communication between the two chambers on the opposite sides of the piston or the isolation valve member may be manually retracted to open position to place the two valve compartments in communication with each other, thereby to place the two chambers on opposite sides of the piston in communication with each other. The valve member is pressure-responsive in the sense that if the pressure in the first valve compartment rises unduly, the pressure differential will force the valve member to its open position to place the two chambers on opposite sides of the piston in communication with each other.

To make the isolation valve member responsive to a pressure differential of a predetermined magnitude, a corresponding magnitude of resistance to opening movement of the valve member must be provided. In the presently preferred embodiment of the invention the required resistance to opening movement of the valve member is provided by dimensioning the valve seat and the valve member for the valve seat to grip the valve member in a frictional manner. Thus, the valve seat serves in effect as a detent to yieldingly maintain the valve member in its closed position in the absence of an excessive pressure differential across the valve member.

A further feature of the invention relates to the fact that it is highly advantageous to use a screw means for manually shifting the piston to contract or expand the control chamber. Unfortunately, however, the operation of such a screw means may tend to rotate the piston instead of advancing the piston. The invention solves this problem by providing the piston with a non-circular shank and by slidingly embracing the shank with fixed means that conforms to the non-circular configuration and thus prevents rotation of the shank.

The features and advantages of the invention may be understood by reference to the following detailed description and the accompanying drawings.

BRIEF DESCRIPTION OF THE DRAWINGS

In the drawings which are to be regarded as merely illustrative:

FIG. 1 is a longitudinal sectional view of the presently preferred embodiment of the invention;

FIG. 2 is a longitudinal section along the line 2—2 of FIG. 1 showing the construction of the isolation valve;

FIG. 3 is a fragmentary transverse section along the line 3—3 of FIG. 1 showing structure that prevents rotation of the piston when the actuating screw is rotated; and FIG. 4 is a diagrammatic view that facilitates understanding the invention.

DESCRIPTION OF THE PREFERRED EMBODIMENT

Referring to the drawings, the apparatus has a cylindrical housing generally designated 10, with an isolation valve 12 mounted thereon. The housing 10 forms a cylinder 14 that is closed by a removable cylinder head 15, the cylinder head having a threaded test port 16 for connection to devices that are to be tested. As shown diagrammatically in FIG. 1, the port 16 may be connected by a pipe 18 to a pressure gage 20 and to a device or unit 22 that is to be tested.

The cylinder 14 is divided by a piston 24 into a control chamber 25 and an equalizing chamber 26 and a concentric extension 28 of the cylinder 14 of reduced diameter has an axial bore to receive means for manual actuation of the cylinder. In the construction shown, the piston has a piston rod 30 that is of square cross sectional configuration and is formed with an axial bore 32 that is internally threaded to cooperate with an actuating screw 34. As shown in FIGS. 1 and 3, the square piston rod 30 slidingly extends through a square aperture 35 of a fixed plate 36 which prevents rotation of the piston in response to operation of the actuating screw 34.

The actuating screw 34 has a smooth shank which is formed with two spaced circumferential ribs 38 that confine an O-ring 40 in sealing contact with the surrounding surface. The inner face of a back-up ring 42 backs against the outermost rib 38 and outer face backs against a roller bearing 44 which is retained by a retaining ring 45. The outer end of the actuating screw 34 is provided with a suitable knob 46 for manual operation of the screw.

As may be seen in FIGS. 1 and 2, the body of the isolation valve 12 has a longitudinal bore of stepped configuration which is open at its smaller end and is provided at its larger end with a gland 50 and a cooperating O-ring 52. The stepped bore forms a small diameter guideway 54 at its smaller end, a slightly enlarged first compartment 55 adjacent the guideway, a cylindrical seat 56 adjacent the first compartment, and a larger second compartment 58 between the valve seat and the gland 50.

A valve member 60 that is circumferentially grooved to receive an O-ring 62 has a guide shank 64 that extends through the first compartment 55 into sliding engagement with the guideway 54. The valve member 60 is further provided with an operating stem 65 which may be manually controlled by an external knob 66. The operating stem 65 extends through the gland 50 and is circumferentially grooved to retain an O-ring 68. In like manner the guide shank 64 is circumferentially grooved to retain an O-ring 69.

As shown in FIG. 2, one side of the isolation valve 12 has a threaded vent port 70 for connection to a suitable vent valve (not shown), the vent port being connected to the second valve compartment 58 by an inclined bore 72. The other side of the isolation valve is provided with a threaded pressure inlet port 74 for connection to a suitable supply valve (not shown) for supplying compressed air, the inlet port being connected by a diagonal bore 75 to the first valve compartment 55.

As shown in FIG. 1, a passage, generally designated 76, for communication between the first valve compartment 55 and the control chamber 25 is formed by a series of bores comprising bore 78 in the isolation valve 12, two intersecting bores 80 and 82 in the cylindrical housing 10, and an inclined bore 84 from the bore 82 to the control chamber 25. In similar manner, a passage, generally designated 85, for communication between the second valve compartment 58 and the equalizing chamber 26 is formed by bores 86 and 88 in the isolation valve 12 and the cylindrical housing 10, respectively.

It is apparent that the valve member 60 may be manually shifted by means of the knob 66 between a closed position in the cylindrical valve seat 56 and an open position in the second valve compartment 58. It is apparent that a predominance of pressure in the first valve compartment 55 will tend to unseat the valve member 60 and thereby open communication between the control chamber 25 and the equalizing chamber 26.

In accordance with the teaching of the invention, suitable provision is made to resist the opening movement of the valve member 60 so long as the pressure differential between the two chambers is below a predetermined magnitude. Within the scope of the invention any suitable provision may be made for such resistance. In the present embodiment of the invention, however, the resistance is provided simply by the friction fit of the valve member 60 in the cylindrical valve seat 56 or, more specifically, is provided by the pressure contact of the O-ring 62 of the valve member with the surrounding wall of the valve seat. The O-ring may be constructed and dimensioned, for example, to resist an unseating pressure differential up to a magnitude of approximately 300 p.s.i. since a pressure differential below that magnitude does not create a hazard.

The manner in which the described apparatus serves its purpose may be readily understood from the foregoing description. With the threaded test port 16 connected to a device to be tested, for example, connected in the manner shown in FIG. 1, and with the vent port 70 connected to a normally closed vent valve and with the isolation valve in its open position, fluid under pressure is admitted through the inlet port 74 to create equal fluid pressures in the control chamber 25 and the equalizing chamber 26. The equalized pressures are relatively close to the precise test pressure that is desired in the device that is to be tested.

With the pressures in the control chamber and equalizing chamber initially balanced in this manner, the knob 66 of the isolation valve is manipulated to close the isolation valve thereby to isolate the control chamber from the equalizing chamber. The knob 46 is then manually rotated for screw action to advance or retract the piston 24 to raise or lower the pressure in the control chamber 25 as required to establish the desired precise test pressure. If the test pressure is above atmospheric pressure, the control chamber and the equalizing chamber are initially filled with compressed air preferably at a value slightly below the desired precise pressure so that only a relatively small advance of the piston 24 is required to establish the desired precise pressure. On the other hand, if the test pressure is below atmospheric, for example, to test a vacuum gage, the control chamber and equalizing chamber are initially vented to the atmosphere to establish atmospheric pressure therein. Thereafter, the isolation valve is closed and the control knob 46 is rotated to retract the piston 24 to evacuate the control chamber to whatever degree is required.

The inherent safety of the testing apparatus may be appreciated by reference to the diagram in FIG. 4, the parts of which have reference numerals corresponding to the heretofore mentioned reference numerals. It is apparent that the first compartment 55 of the isolation valve is, in effect, part of a vent passage for the control chamber 25 and also, in effect, is an extension of the control chamber. In like manner, it is apparent that the second valve compartment 58 forms part of a vent passage for the equalizing chamber 26 and is, in effect, an extension of the equalizing chamber.

Since the pasage 76 from the first valve compartment 55 to the control chamber 25 is always open and since the vent passage 85 communicates solely with the equalizing chamber, it is impossible for any inadvertently created excessive pressure differential to exist unless the higher of the two pressures is in the control chamber 25. Thus, if inadvertently the isolation valve is closed when fluid is initially admitted from the high pressure source, the fluid will flow into the control chamber 25 until the predetermined pressure differential is reached whereupon the isolation valve will open automatically to admit the high pressure fluid into the equalizing chamber 26. On the other hand, with the two chambers 25 and 26 at relatively high fluid pressure, inadvertent opening of the vent valve while the isolation valve is closed will result in a rapid pressure drop in the equalizing chamber 26, but when the resulting pressure differential reaches the predetermined magnitude the isolation valve will open automatically to destroy the pressure differential.

My description in specific detail of the selected embodiment of the invention will suggest various changes, substitutions, and other departures from my disclosure within the spirit and scope of the appended claims.

I claim:

1. In an apparatus of the character described for creating a precise gas pressure for testing a device, wherein a manually operable piston divides a cylinder into a control chamber for connection to the device and an equalizing chamber and wherein means is provided to place the two chambers in communication with a pressure source for initially creating equal pressures in the two chambers and means is provided to isolate the control chamber from the equalizing chamber to permit manual shifting of the piston to establish said precise gas pressure in the control chamber, the improvement comprising:
means to place said two chambers in communication with each other in response to a predetermined rise in pressure in the control chamber over the pressure in the equalizing chamber to prevent an excessive pressure differential between the two chambers in the event that the pressure source is inadvertently placed in communication with the control chamber while the isolating means is effective and in the event that the equalizing chamber is inadvertently vented while the isolation means is effective and while relatively high pressure exists in the control chamber.

2. An improvement as set forth in claim 1 in which the means for communication between the apparatus and the pressure source includes an inlet port in the control chamber and in which a vent port for the apparatus is in the equalizing chamber, said inlet port and said vent port insuring that any inadvertently created pressure differential between the two chambers of excessive magnitude will be in favor of the control chamber.

3. An improvement as set forth in claim 1 in which said piston has a piston rod united therewith;
in which a manually operable screw means engages the piston rod to advance and retract the piston;
in which at least a portion of the piston rod is non-circular;
and which includes fixed means of similar non-circular inside configuration slidingly embracing the piston rod to prevent rotation of the piston rod in response to rotation of the screw means.

4. An improvement as set forth in claim 3 in which the piston rod is of polygonal cross sectional configuration and in which the inner configuration of the fixed means is also polygonal.

5. In an apparatus of the character described for creating a precise gas pressure for testing a device, wherein a manually operative piston divides a cylinder into a control chamber for connection to the device and an equalizing chamber and wherein an isolation valve is operable to open position to interconnect the two chambers for initially balancing the pressures in the two chambers and is operable to a closed position to isolate the control chamber from the equalizing chamber to permit manual shifting of the piston for establishing the desired precise pressure in the control chamber, the improvement comprising:
said isolation valve being pressure-responsive to open in response to a predetermined excessive rise in the pressure in said control chamber over the pressure in the equalizing chamber to prevent an excessive differential between the pressures in the two chambers in the event the pressure source is inadvertently placed in communication with the control chamber while the isolating means is effective and in the event that the equalizing chamber is inadvertently vented while the isolation means is effective and while relatively high pressure exists in the control chamber.

6. An improvement as set forth in claim 5 in which the isolating means is an isolation valve that is divided into a first compartment adapted for communication both with a pressure source and with said control chamber and a second compartment adapted for communication with the equalizing chamber;
in which a passage in the isolation valve connects said two compartments;
in which a valve seat is formed by said passage;
in which a valve member cooperative with said seat to cut off communication between the two compartments is manually retractable towards the second compartment to open position;
in which the valve member when seated is urged towards open position by predominance of pressure in the first compartment over pressure in the second compartment;
and which includes means to yieldingly resist retraction of the valve member from its closed position to its open position until a rise in pressure in the first compartment relative to the pressure in the second compartment exceeds a predetermined magnitude.

7. An improvement as set forth in claim 6 in which the equalizing chamber has a vent port for venting both chambers.

8. An improvement as set forth in claim 7 in which the vent port is connected to the second compartment of the equalizing valve.

9. An improvement as set forth in claim 6 in which the means to yieldingly resist retraction of the valve member from the valve seat is frictional resistance means.

10. An improvement as set forth in claim 9 in which the valve seat is dimensioned to frictionally engage the valve member to provide the yielding resistance to retraction of the valve member from the valve seat.

11. An improvement as set forth in claim 6 in which the first compartment of the isolation valve has a port for connection with the pressure source and a second port in communication with the control chamber; and in which the second compartment of the isolation valve has a port for communication with the equalizing chamber.

12. An improvement as set forth in claim 11 in which the second compartment of the isolation valve has a port for venting the two chambers.

References Cited

UNITED STATES PATENTS 3,164,979   1/1965   Siegel et al. _____ 73—4

MARTIN P. SCHWADRON, *Primary Examiner.*

ROBERT R. BUNEVICH, *Assistant Examiner.*

U.S. Cl. X.R.

60—62.5; 73—37